United States Patent
Bhaskar et al.

(10) Patent No.: US 7,501,143 B2
(45) Date of Patent: Mar. 10, 2009

(54) MILK PRODUCT AND PROCESS

(75) Inventors: Ganugapati Vijaya Bhaskar, Aokautere (NZ); Brian Ashley Kells, Fitzherbert West (NZ)

(73) Assignee: New Zealand Dairy Board (NZ)

( * ) Notice: Subject to any disclaimer, the term of this patent is extended or adjusted under 35 U.S.C. 154(b) by 0 days.

(21) Appl. No.: 10/149,162

(22) PCT Filed: Dec. 11, 2000

(86) PCT No.: PCT/NZ00/00247

§ 371 (c)(1),
(2), (4) Date: Apr. 15, 2004

(87) PCT Pub. No.: WO01/41579

PCT Pub. Date: Jun. 14, 2001

(65) Prior Publication Data

US 2004/0197440 A1  Oct. 7, 2004

(30) Foreign Application Priority Data

Dec. 9, 1999 (NZ) .................................. 501675

(51) Int. Cl.
A23C 9/00 (2006.01)
(52) U.S. Cl. .................. 426/580; 426/271; 426/491
(58) Field of Classification Search .............. 426/271, 426/422, 423, 424, 478, 490, 491, 580, 583, 426/587, 588, 590
See application file for complete search history.

(56) References Cited

U.S. PATENT DOCUMENTS

| | | | |
|---|---|---|---|
| 2,346,844 A | 4/1944 | Hull | |
| 2,503,866 A | 4/1950 | Chryslter et al. | |
| 2,707,152 A | 4/1955 | Johnson et al. | |
| 2,879,166 A | 3/1959 | Wilcox | |
| 4,018,752 A | 4/1977 | Buhler et al. | |
| 4,450,182 A | 5/1984 | Stahl et al. | |
| 4,676,988 A | 6/1987 | Efstathiou et al. | |
| 4,919,960 A * | 4/1990 | Ahmed et al. | 426/580 |
| 5,576,040 A | 11/1996 | Moller et al. | |
| 5,980,961 A | 11/1999 | Berrocal et al. | |
| 6,139,901 A | 10/2000 | Blazey et al. | |

FOREIGN PATENT DOCUMENTS

| | | |
|---|---|---|
| EP | 016292 | 10/1980 |
| EP | 16292 | 10/1980 |
| EP | 0 226 035 | 11/1986 |
| FR | 2450064 | 9/1980 |
| FR | 2452879 | 10/1980 |
| FR | 2470546 | 6/1981 |
| GB | 654 377 A | 6/1951 |
| JP | 63-188346 | 8/1988 |
| JP | 63188346 | 8/1988 |
| JP | 4179440 | 7/1990 |
| NZ | 330484 | 2/1995 |

OTHER PUBLICATIONS

Webb et al., Fundamentals of Dairy Chemistry, 1965, The AVI Publishing Company, Inc., Westport, CT, pp. 340 and 341.*
Wong, "Food Processing", Huihu Publishing Ltd, 1998; p. 68 (with translation in English in 1 page).
Korolczuk J, New Zealand Journal of Dairy Science and Technology, 17, 135-140 (1982).
Puri et al., Indian Journal of Dairy Science, 22, 155-161 (1969).
Puri et al., Indian Journal of Dairy Science, 30, 27-29 (1977).
Ranjith et al., Journal of Dairy Research, 66, 139-144 (1999).
Starbuck, Kidney International, 2, 175-177, (1972).
A. Caron et al. "Coagulation of Milk Enriched With Ultrafiltered or Diafiltered Microfiltered Milk Retentate Powders", Int. Dairy Journal 7 (1997) pp. 445-451.
Eckles et al. "Milk and Milk Products", McGraw Hill, 4th Edition, pp. 22, 68-72, 1951.
St. Gelais et al. "Coagulation of Milk Enriched With Low Mineral Retentate Powders", Milchwissenschaft 48 (1993) pp. 603-606.

* cited by examiner

Primary Examiner—Leslie Wong
(74) Attorney, Agent, or Firm—Knobbe Martens Olson & Bear LLP

(57) ABSTRACT

The invention relates to a translucent milk drink and a method for preparing it. The drink may be prepared by (a) providing an opaque milk starting material having a pH in the range of 5.6-8.0, preferably 5.6-7.0, most preferably 5.7-6.5; (b) contacting at least a portion of the starting material with a cation exchanger until the percentage transmission of the material (when separated from the exchanger) rises to at least 5%, preferably at least 25%, more preferably at least 40%; (c) optionally mixing the translucent milk sample with another milk sample while retaining the percentage transmission at least 5%, preferably at least 25%, more preferably at least 40%. The milk drink may be used as the base for a soft drink like milk drink, which may be carbonated.

25 Claims, 2 Drawing Sheets

Preparation of Calcium Depleted MPCs

US 7,501,143 B2

MILK PRODUCT AND PROCESS

REFERENCE TO RELATED APPLICATIONS

This application is a national stage filing of PCT/NZ00/00247, filed Dec. 11, 2000 and claims priority to New Zealand Patent Application Number NZ 501675, filed Dec. 9, 1999. Each of the priority applications is hereby incorporated by reference in its entirety.

TECHNICAL FIELD

This invention relates to novel milk products.

BACKGROUND ART

Milk and flavored milks have received wide acceptance among consumers for centuries. Much of this acceptance has related to recognition of the valuable nutrient content of the drinks.

Soft drinks and particularly carbonated soft drinks have also received wide acceptance based primarily on flavor, appearance and carbonation, despite a poor nutrient content.

U.S. Pat. No. 4,676,988 discloses a process in which milk in contacted with a strong cation-exchange in resin in acid form for a time sufficient to lower the pH in the milk to between 1.5 and 3.2. In this process the milk cations are exchanged with hydrogen ions. The decationised milk is contacted with a strong anion-exchange in resin in base form for a time sufficient to raise the pH of the milk to the value of about 3.5-4.5. This material is mixed with decationised, deanionised fruit juice to form a drink. This process has disadvantages in that it consists of numerous steps and involves adjusting the pH of a milk to a pH at which denaturation of proteins occurs.

It is an object of the present invention to provide an improved milk drink base suitable for making milk drinks more like soft drinks; and/or, milk drinks like soft drinks derived from the base; and/or processes for the preparation of the base and the milk drinks like soft drinks and/or provide the public with a useful and nutritious choice.

DISCLOSURE OF THE INVENTION

In one aspect the invention provides a method of preparing a translucent milk drink comprising:
 (a) providing an opaque milk starting material having a pH in the range 5.6-8.0 preferably 5.6-7.0, more preferably 5.7-6.5;
 (b) contacting at least a portion of the starting material with a cation exchanger until the percentage transmission of the material (when separated from the exchanger) rises to at least 5%, preferably at least 25%, more preferably at least 40% when measured as herein described;
 (c) optionally mixing the translucent milk sample with another milk sample while retaining the percentage transmission of at least 5%, preferably at least 25%, more preferably at least 40%

Translucency of milk was measured with a Turbiscan MA 2000 Macroscopic Analyser (Formulaction, Toulouse, France) using transmission of a pulsed near infrared (NIR) light source ($\lambda$=850 nm). The sample is contained in a special sample cell and NIR is passed through the sample and a transmission detector receives the light, which goes through the sample. The transmission detector acquires the transmitted light flux (in %) as a function of the sample height (65 mm). For the definition of translucency, we have taken an average value of transmission from 20 mm to 50 mm height of the sample cell. The pathlength is 1 cm.

In a second aspect the invention provides a method of preparing a translucent milk drink comprising:
 (a) providing an opaque milk starting material having a pH in the range 5.6 to 8.0, preferably 5.6-7.0, more preferably 5.7-6.5;
 (b) removing at least 50-100%, preferably 60-100% more preferably 80-100% of calcium therein by cation exchange on a cation exchanger;
 (c) optionally mixing the calcium-depleted milk sample with another milk sample while retaining the percentage calcium depletion in the range 50-100%, preferably 60-100%, more preferably 80-100%.

In preferred forms of the invention the opaque milk starting material is chosen from skim milk, milk protein concentrate (MPC) or milk protein isolate (MPI).

The preferred cation exchangers are based on resins bearing strongly acidic groups, preferably sulphonate groups.

In a third aspect the invention may be said to broadly consist in a translucent milk drink prepared by the method of either the first or second aspect of the invention.

In a fourth aspect the invention may be said to consist in a translucent milk drink having a pH in the range 5.6 to 8.0, preferably 5.6 to 7.0 more preferably 5.7-6.5.

In a fifth aspect the invention provides a nutritional milk drink wherein the base is a translucent milk of the third or fourth aspect of the invention which also includes one or more of a flavouring, a colouring and carbonation. In a preferred form, flavouring, colouring and carbonation are all present.

Preferably in each aspect of the invention the translucent milk product contains greater than 0.8% (w/v), preferably greater than 2% (w/v) milk protein.

By the term "opaque milk starting material" is meant milk, skim milk or a milk derived product containing casein and whey proteins with 5-60% of the protein being whey proteins. Preferably the starting material has substantially the same proportions of casein and whey proteins as milk. Preferably the fat content is less than 10% (w/w) of the protein content. If whole milk is used a fat removal step is also required (e.g. by centrifugation) before measurement of translucency.

The term "skim milk" means skim milk separated from whole milk of mammals which optionally has been pasteurised and includes diluted, ultrafiltered or concentrated partly de-mineralised skim milk in which the carbohydrate level has been adjusted provided always that the original percentages of casein to whey proteins have remained substantially unaltered.

The term "milk protein concentrate" (MPC) refers to a milk protein product in which greater than 55%, preferably greater than 70%, more preferably greater than 75% of the dry matter is milk protein. The ratio of casein to whey proteins is approximately that of milk.

The term "milk protein isolate" (MPI) refers to a milk protein composition comprising substantially unaltered proportion of casein to whey proteins wherein the dry matter consists of greater than 85% milk protein.

MPC and MPI may be prepared by ultrafiltration of skim milk where the ultrafiltration membrane has a molecular weight cut off of 10,000 or lower. Diafiltration may also be used.

If MPC or MPI is used it is possible to generate a solution with 10-12% (w/v) protein which is still translucent.

The pH range chosen brings considerable advantages. Below pH 5.6 the solutions tend to coagulate. Above pH 8.0 the taste is inferior and the solution is not suitable for carbonation. Values for pH below 7.0 are preferred. If the cation exchange process results in the product having a pH greater than 7.0 it is preferred to reduce the pH, for example by addition of citric acid solution.

A preferred strong acid cation exchange resin for use in the invention is IMAC HP 111 E manufactured by Rohm & Haas. This resin has a styrene divinylbenzene copolymer matrix. The functional groups are sulphonic acid groups that can be obtained in the $Na^+$ form or alternatively converted to the $K^+$ form. It is preferred that the ion exchange resin be in the $Na^+$ and/or $K^+$ form.

By manipulating the pH, and the choice of cation it is possible to vary the flavour of the translucent milk produced. For some circumstances it will be useful to provide micronutrient cations in addition to sodium or potassium. One preferred cation for use with sodium and or potassium is magnesium.

The use of strong acid cation exchangers is preferred because with weak acid cation exchangers, phosphate is also removed which results in lower nutritional value and a non-translucent product.

The process is preferably carried out in a cool temperature in the range 4° C. to 12° C. but may be carried out at temperatures as high as 50° C.

The translucent milks of the invention can be converted into a soft drink like milk drink by addition of small amounts of other components, especially colour and flavour. Typically 0.1 to 3% each of vitamins, flavour, preservatives, thickeners, flavour enhancers and the like are added. Materials suitable for carrying out these functions in drinks are well known.

For convenience, a dried product can be prepared from the translucent milk. The drying may be by standard techniques. The product may be reconstituted in water to prepare a translucent milk. It has good suspendability even in cold water at 4° C. to 12° C. Colourings and flavourings may be present in the dried product or may be added subsequently.

In addition to drinks, the translucent milk products may be used to form nutritious gels and jellies. These may be prepared using conventional gelling agents.

Especially preferred are carbonated drinks. Carbonation can be carried out by means known to those skilled in the art. Example 5 herein illustrates carbonation using dry ice. Other options include using commercial carbonation systems.

EXAMPLES

The following examples further illustrate practice of the invention.

Example 1

Determination of Translucency

Determination of Translucency

Translucency of milk is measured using transmission of a pulsed near infrared (NIR) light source ($\lambda$=850 nm) using Turbiscan. The sample is contained in a special sample cell and NIR is passed through the sample and a transmission detector receives the light, which goes through the sample. The transmission detector acquires the transmitted light flux (in %) as a function of the sample height (65 mm). For the definition of translucency, we have taken an average value of transmission from 20 mm to 50 mm height of the sample cell. The pathlength is 1 cm.

Figure 1:
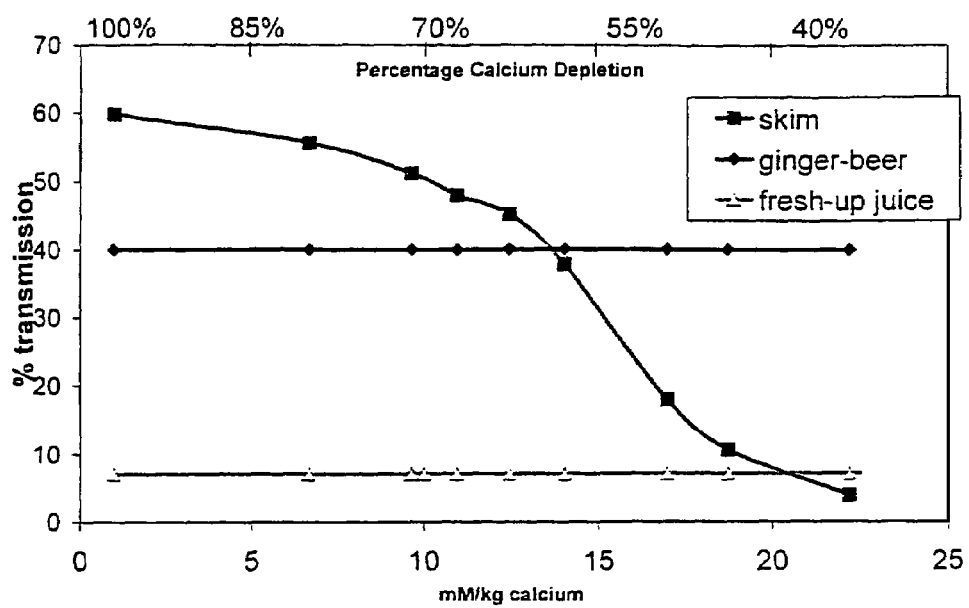
FIG. 1 shows % transmission of skim milk with varying % calcium depletion and comparison with ginger beer and freshup orange juice.

FIG. 1 shows the translucency of various calcium-depleted skim milks and two commercial products. The ginger beer is the "Bunderburg" ginger beer and the freshup is the "Freshup" orange juice. Freshup has a transmission value of 7%, whereas ginger beer has a transmission value of 40%. The transmission values given FIG. 1 indicates that for "Ginger beer" type of translucency, about 60% depletion of calcium is required and for the "Fresh-up" type translucency about 40% of calcium removal is required.

Example 2

Preparation of Translucent Milk From Skim Milk

Skim milk of composition given in Table 1 was adjusted to pH of 5.8 using 3.3% citric acid. After 15 min, the pH of skim milk was measured. Due to buffering of milk, the pH of the acidified milk increases by 0.1 to 0.15 units. The pH was again adjusted to 5.8 with some more 3.3% citric acid.

To remove 80% of calcium from skim milk having a calcium content of about 33 mM/kg, a skim milk to resin ratio of about 12 is used. For example 200 ml of skim milk at a pH of 5.83 was contacted with 17 g of resin, in 500 ml beaker and stirred constantly with a magnetic stirrer. The resin was an IMAC HP 111 E, a strong cation exchange resin with a total exchange resin with a total exchange capacity of 2 req/L of sodium. The resin is manufactured by Rohm & Haas and has sulphonic acid functional groups.

The stirrer speed is such that all the resin is suspended in the skim milk and its pH is monitored. The pH of the mixture increases with time—such as 6.15 at 5 min, 6.32 in 15 mins and after 25 minutes the pH reached a final value of 6.47. At this time the resin was separated from mixture and its calcium content is measured. Table 2 gives typical pHs and calciums of skim milk at different skim milk to resin ratios, as well as their translucency transmission values.

TABLE 1

Milk Composition

| Component | Skim Milk (%) |
|---|---|
| Ash | 0.76 |
| Lactose | 5.17 |
| Fat | 0.06 |
| Casein Protein | 2.88 |
| Whey Protein | 0.58 |
| Total Protein | 3.67 |

TABLE 2

Compositions of calcium depleted skim milks

| | | | | |
|---|---|---|---|---|
| Skim milk (ml) | 200 | 200 | 200 | 200 |
| Skim milk pH | 5.83 | 5.83 | 5.83 | 5.83 |
| Resin weight (g) | 0 | 10 | 14 | 17 |
| Final calcium | 32.7 | 16.9 | 12.4 | 6.7 |
| Final pH | 5.83 | 6.24 | 6.4 | 6.5 |
| Percentage calcium depletion | 0 | 48 | 62 | 80 |
| Transmission value (%) | 0 | 17.8 | 45.2 | 55.7 |

Example 3

Manufacture of Calcium Depleted Milk Powder

1000 L of skim milk was adjusted to a pH of 5.8 using dilute citric acid (eg. 3.3%). 100 L of the strong cation-exchange resin described in Example 2 was filled in a stainless steel vessel of about 40 cm diameter and a height of 100 cm or a total volume of 140 L. One hundred litres of resin bed had a height of 80 cm. The 1000 L of skim was then passed through the resin at 4 bed volumes an hour or 400 L of skim milk per hour. The resulting skim milk had about 10% of the original calcium. This skim milk was evaporated and dried to produce calcium depleted skim milk powder of composition, on a moisture free basis, given in Table 3.

TABLE 3

Composition of ca-depleted milk powder

| Component | | | |
|---|---|---|---|
| Protein | Lactose | Ash | Calcium |
| 37.5 | 51 | 10 | 0.1 |

(% row)

This calcium depleted milk powder was reconstituted to 6% solids and its translucency was measured, to be about 60%.

Example 4

UHT Treatment of Reconstituted Milk Powder

The reconstituted sample from example 2 was UHT treated in indirect UHT equipment with conditions of 140° C. for 4 s. The resulting UHT sample was more translucent than the reconstituted sample. Its transmission value was about 64%.

Example 5

Carbonation of UHT Treated Reconstituted Skim Milk Powder

The UHT treated reconstituted skim milk powder from the previous example was carbonated by adding dry ice (frozen carbon dioxide) in powdered form. Typical carbonation levels in translucent milks are about 3.5 volumes bunsen. This level of carbonation compares well with commercial carbonated products, i.e soda water—4.5 volumes of bunsen, cola—4.2 volumes bunsen, lightly sparkling—3.0 volumes bunsen.

In addition to carbonation, flavours such as lemon/lime, grape and orange as well as appropriate colours were added to make the product resemble commercial soft or sports drinks.

Example 6

Translucent Milks from MPCs

Figure 2:
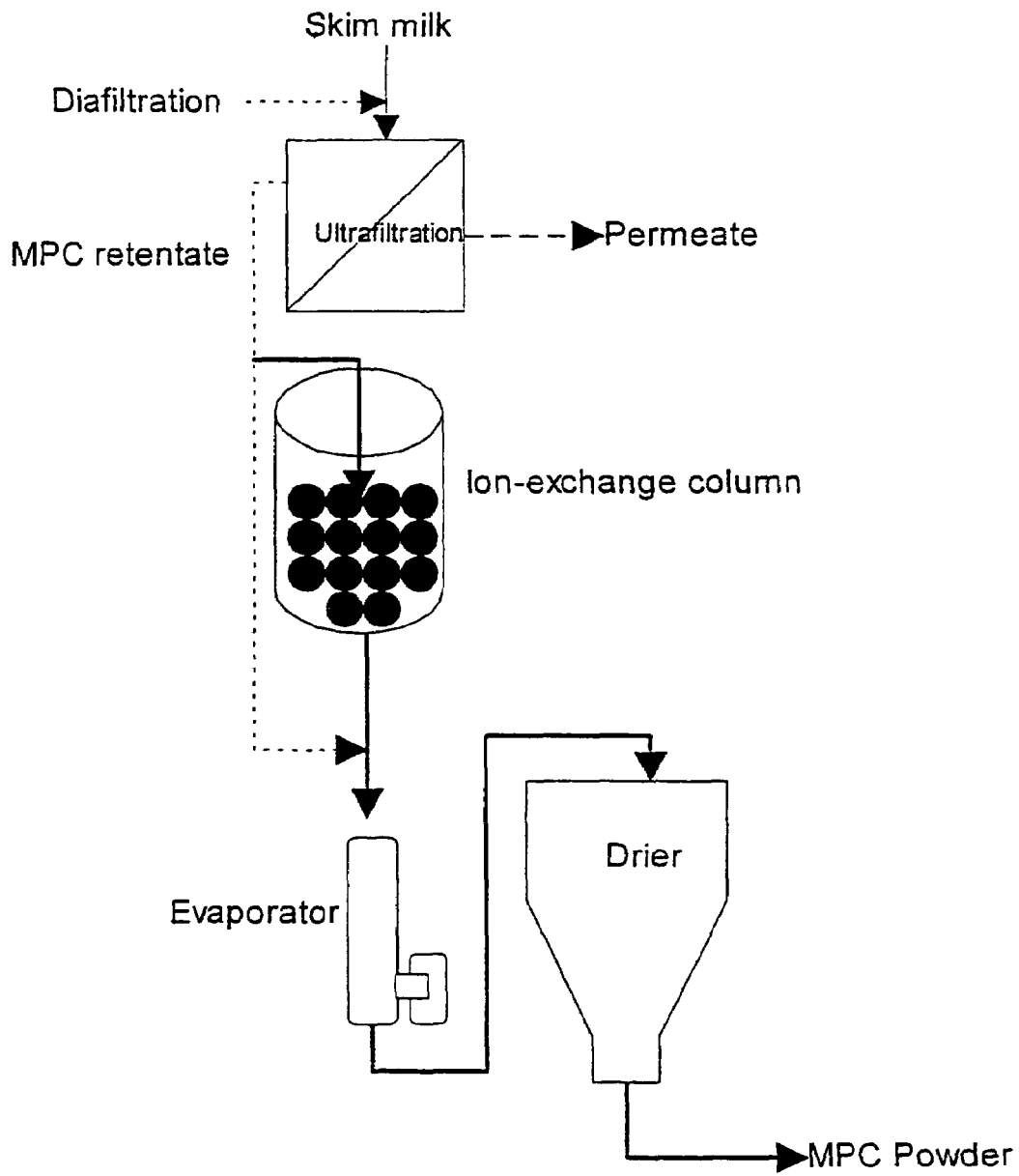
FIG. 2 is a schematic drawing of a process for preparing a calcium depleted MPC powder.

As illustrated in FIG. 2, skim milk is subjected to concentration on an ultrafiltration (or a microfiltration) membrane (Koch S4 HFK 131 type membranes having a nominal molecular weight cut-off of 10,000 daltons) to produce an MPC retentate. Depending on the concentration factor used, the MPC retentate will have a protein content in the range of 42-85% of the dry matter is milk protein.

For example when a skim milk of 1000 kg of concentration given in Table 1, is concentrated by 2.5 times, 400 kgs of MPC56 retentate and 600 kgs of permeate will be obtained.

Part of 267 kg of MPC56 retentate, which had a pH of 6.8 was reduced to 5.9, using 3.3% citric acid. The acid was added to the retentate at 10° C., while continuously agitating the retentate. For example, to produce 75% Ca-depleted MPC56, 200 Kg of the retentate was pH-adjusted to 5.9. After fifteen minutes, the pH of the retentate was measured again. Depending on the buffering capacity of the retentate, the pH of pH-adjusted retentate increases by 0.1 to 0.15 units. The pH was adjusted again to 5.9 with some more 3.3% citric acid.

The 200 kg of MPC56 retentate contains 0.26% of calcium or a total calcium content of 530 g of calcium. To remove all this calcium approximately 70 L of strong cation-exchange resin in the sodium form was used. The resin was an IMAC HP 111 E, a strong acid cation exchange resin with a total exchange capacity of 2 eq/L of sodium.

The resin is manufactured by Rohm & Haas and has sulphonic acid functional groups.

The resin was loaded into a stainless steel vessel of about 40 cm in diameter and a height of 110 cm or a total volume of 140 L. Seventy litres of the resin bed had a height of 55 cm. The 200 kg of the retentate was then passed through the resin at 2 bed volume an hour or 140 L/h. To process 200 kg of the retentate takes about one-and-a-half hours. The resulting retentate had about 0.005% of calcium and a pH of about 7.1. The calcium-depleted MPC56 was mixed with untreated MPC56 the remaining 67 Kg of MPC56 to produce a retentate containing 0.4% calcium. This retentate was then evaporated and dried to produce an MPC56 powder containing 0.4% calcium. The composition of the powder is shown in column A of Table 2.

If an MPC70 or an MPC85 retentate is used as a feed stream instead of MPC56 retentate, then Ca-depleted MPC70 and MPC85 of the compositions given in columns B and C respectively Table 2 below can be produced. MPC70 and MPC85 retentates are diluted prior to passage through the ion-exchange column.

TABLE 4

Compositions of Milk Protein Concentrates

| MPC | A | B | C |
|---|---|---|---|
| Total protein | 56 | 70 | 85 |
| Ash | 7-9 | 7-9 | 6-8 |
| Lactose | 28-30 | 14-16 | <5 |
| Fat | 0.9-1.1 | 1.5-1.6 | >1.7 |
| Calcium | 0.4 | 0.45 | 0.55 |
| Sodium(%) | 2.4 | 2.6 | 3.0 |

These MPCs can be reconstituted at various protein concentrations to produce translucent milks. For example, for a translucent milk containing 2% protein, dissolve 2.5 g of Ca-depleted MPC85 in 100 ml of water. This reconstituted MPC85 solution looks translucent, which can be UHTed, carbonated and flavour added to produce the sample translucent product described in examples 3, 4 and 5.

Example 7

Flavoured Drink

In an agitated mixing vessel, combine water (55° C.) (92.23 parts), sucrose (6 parts) and milk solids from dried translucent milk prepared according to Example 3 or Example 6 (1.5 parts). Hydrate for 10 minutes. Gradually add 20% citric acid solution (0.15 parts) with agitation. Add honeydew flavour (Givaudan Roure 55482AA, 0.05 parts), rock melon flavour (Givaudan Roure 55480AA, 0.05 parts) and a green colour (1:100, Bush Boake Allen, 0.02 parts), and mix well.

Preheat product to 75° C. Process product at 137° C. for 3 seconds. Bottle aseptically.

The above Examples are illustrations of the practice of the invention. It will be appreciated by those skilled in the art that the invention can be carried out with numerous modifications and variations. For Example the material subjected to cation exchange can be varied, the ion exchange medium can be varied, the percentage calcium depletion and the milk protein concentration can also be varied.

The invention claimed is:

1. A method of preparing a translucent milk drink having a pH in the range of 5.6-7.0 comprising:
    (a) providing an opaque milk starting material having a fat content less than 10% (w/w) of the protein content;
    (b) contacting at least a portion of the starting material with a cation exchanger charged with either exchangeable sodium or potassium cations or both to remove calcium until the percentage transmission of the material (when separated from the exchanger) rises to at least 5% when a 1 cm layer of the sample is illuminated at a wavelength of 850 nm, thereby forming a translucent milk drink,
    wherein the pH of the starting material is adjusted such that the translucent milk drink has a pH in the range of about 5.6 to about 7.0.

2. A method of preparing a translucent milk drink having a pH in the range of 5.6-7.0 comprising:
    (a) providing an opaque milk starting material having a fat content less than 10% (w/w) of the protein content;
    (b) removing at least 50-100% of the calcium therein by cation exchange on a cation exchanger charged with either exchangeable sodium or potassium cations or both, thereby forming a translucent milk drink,
    wherein the pH of the starting material is adjusted such that the translucent milk drink has a pH in the range of about 5.6 to about 7.0.

3. A method as claimed in claim 1 or claim 2 wherein the final percentage calcium-depletion is 60%-100%.

4. A method as claimed in claim 1 or claim 2 wherein the final percentage calcium-depletion is in the range of 80-100%.

5. A method as claimed in claim 1 or claim 2 wherein the opaque milk starting material is a low fat milk sample chosen from skim milk, milk protein concentrate or milk protein isolate.

6. A method as claimed in claim 1 or claim 2 where the cation exchanger is a resin bearing strongly acidic groups.

7. A method as claimed in claim 1 or claim 2 wherein calcium ions are replaced by sodium ions, potassium ions or a mixture of sodium and potassium ions.

8. A method as claimed in claim 1 or claim 2 further comprising the step of drying the translucent milk.

9. The method of claim 1 wherein the percentage transmission of the material rises to at least 25%.

10. The method of claim 2 wherein the calcium-depleted milk sample is mixed with another milk sample while maintaining calcium depletion in the range of 50-100%.

11. A method as claimed in claim 9 or claim 10 wherein the final percentage calcium-depletion is from 60% to 100%.

12. A method as claimed in claim 9 or claim 10 wherein the final percentage calcium-depletion is from 80% to 100%.

13. A method as claimed in claim 9 or claim 10 wherein the opaque milk starting material is a low fat milk sample chosen from skim milk, milk protein concentrate or milk protein isolate.

14. A method as claimed in claim 9 or claim 10 where the cation exchanger is a resin bearing strongly acidic groups.

15. A method as claimed in claim 9 or claim 10 wherein calcium ions are replaced by sodium ions, potassium ions or a mixture of sodium and potassium ions.

16. A method as claimed in claim 9 or claim 10 further comprising the step of drying the translucent milk.

17. The method of claim 1 wherein the percentage transmission of the material rises to at least 40%.

18. A method as claimed in claim 17 wherein the final percentage calcium-depletion is from 60% to 100%.

19. A method as claimed in claim 17 wherein the final percentage calcium-depletion is from 80% to 100%.

20. A method as claimed in claim 17 wherein opaque milk starting material is a low fat milk sample chosen from skim milk, milk protein concentrate or milk protein isolate.

21. A method as claimed in claim 17 where the cation exchanger is a resin bearing strongly acidic groups.

22. A method as claimed in claim 17 wherein calcium ions are replaced by sodium ions, potassium ions or a mixture of sodium and potassium ions.

23. A method as claimed in claim 17 further comprising the step of drying the translucent milk.

24. A method of preparing a translucent milk drink having a pH in the range of 5.6-7.0 comprising:
    (a) providing an opaque milk starting material having a fat content less than 10% (w/w) of the protein content;
    (b) contacting at least a portion of the starting material having a pH in the range of 5.7-6.5 with a cation exchanger charged with either exchangeable sodium or potassium cations or both to remove calcium until the percentage transmission of the material (when separated from the exchanger) rises to at least 5% when a 1 cm layer of the sample is illuminated at a wavelength of 850 nm, thereby forming a translucent milk drink,
    wherein the pH of the starting material is adjusted such that the translucent milk drink has a pH in the range of about 5.6 to about 7.0.

25. A method of preparing a translucent milk drink having a pH in the range of 5.6-7.0 comprising:
    (a) providing an opaque milk starting material having a fat content less than 10% (w/w) of the protein content;
    (b) removing at least 50-100% of the calcium from the starting material by cation exchange on a cation exchanger charged with either exchangeable sodium or potassium cations or both, wherein the starting material has a pH in the range 5.7-6.5, thereby forming a translucent milk drink,
    wherein the pH of the starting material is adjusted such that the translucent milk drink has a pH in the range of about 5.6 to about 7.0.

* * * * *